United States Patent [19]

Whetstone et al.

[11] Patent Number: 4,514,726

[45] Date of Patent: Apr. 30, 1985

[54] NOISE MOUSE

[75] Inventors: Albert L. Whetstone, Milford; Kerry L. Shaklee, Fairfield; Khosrow Modjallal, Killingworth, all of Conn.

[73] Assignee: Display Interface Corporation, Milford, Conn.

[21] Appl. No.: 524,924

[22] Filed: Aug. 19, 1983

[51] Int. Cl.³ .............................................. G09G 1/00
[52] U.S. Cl. .................................... 340/710; 340/706; 178/18; 310/311
[58] Field of Search ............... 340/706, 707, 709, 710, 340/365 A, 669, 670; 178/18; 310/311, 318, 338, 348; 324/162, 165, 171

[56] References Cited

U.S. PATENT DOCUMENTS

| 3,304,434 | 2/1967 | Koster | 250/231 |
|---|---|---|---|
| 3,346,853 | 10/1967 | Koster . | |
| 3,383,914 | 5/1968 | MacArthur | 310/338 |
| 3,462,548 | 8/1969 | Rinder | 178/18 |
| 3,528,295 | 9/1970 | Johnson et al. | 73/432 |
| 3,541,541 | 11/1970 | Engelbart | 340/710 |
| 3,835,464 | 9/1974 | Rider | 340/710 |
| 3,892,963 | 7/1975 | Hawley et al. | 250/231 |
| 3,987,685 | 10/1976 | Opocensky | 340/710 |
| 4,078,226 | 3/1978 | Eernisse | 310/311 |
| 4,091,234 | 5/1978 | Bristow | 178/18 |
| 4,303,914 | 12/1981 | Page | 340/706 |
| 4,318,096 | 3/1982 | Thornburg et al. | 340/706 |
| 4,354,102 | 10/1982 | Burns et al. | 250/201 |
| 4,364,035 | 12/1982 | Kirsch | 340/710 |
| 4,369,439 | 1/1983 | Broos | 340/710 |
| 4,390,873 | 6/1983 | Kirsch | 340/710 |

OTHER PUBLICATIONS

IBM Technical Disclosure Bulletin, "Cursor Positioning Device", M. Karnaugh, vol. 22, No. 7, Dec. 1979, pp. 2998-2999.

Primary Examiner—Gerald L. Brigance
Attorney, Agent, or Firm—Cifelli, Frederick & Tully

[57] ABSTRACT

A mouse comprises a cover and a displacement pad which is displaced upon movement of the mouse over a surface. Displacement transducer means, e.g., strain gauges mounted in a parallel arm linkage, are used to ascertain direction of motion. Noise created by sliding motion is monitored by a microphone, the output of which is a function of velocity and therefore distance. The microphone may be mounted to the displacement pad, and the pad and microphone covered with a friction and vibration enhancing medium, such as felt. The displacement pad may also be suspending in a computer terminal and be "stroked" to achieve displacement and noise. Calculating means produce cursor dot control signals based on displacement and noise.

31 Claims, 9 Drawing Figures

NOISE MOUSE

FIELD OF INVENTION

The invention herein relates to a cursor controller, or mouse, which generates control signals based upon interaction with a passive work surface as the mouse is moved thereon, or when manipulated directly.

BACKGROUND OF INVENTION

A mouse is distinguished from other cursor control systems such as light pens and digitizers in that those other systems utilize an active surface or grid in communication with a cursor, pen, or the like. A mouse is utilized on a passive surface, such as a desk top or papers on the desk top, with motion of the mouse producing corresponding motion of a cursor dot on a visual display.

There are two basic types of mice available heretofor, namely mechanical and optical mice. The first type of mechanical mouse is comprised generally of a housing supported for rolling motion by two wheels, the wheels being oriented perpendicular with respect to each other for rolling motion in perpendicular axes. Thus, when the mouse is moved on a work surface, the slipping and rolling of each wheel corresponds to direction and distance motion in one axis. The rotation of the wheels is translated into signals used to produce corresponding movement of a cursor on a cathode ray tube display. Engelbart U.S. Pat. No. 3,451,541 and Hawley U.S. Pat. No. 3,892,963 disclose examples of two-wheel mechanical mice.

In a second type of mechanical mouse, the housing mounts a sphere which rolls on the work surface, and the housing further mounts wheels which are driven by the sphere, the wheels having transducers associated therewith for providing signals indicative of motion of the mouse in two axes. A mouse of the spherical ball type is disclosed in Rider U.S. Pat. No. 3,835,464. The spherical ball mouse eliminates some of the problem of dragging one wheel sideways when motion is not in the plane of that wheel, but slippage of the wheels and of the sphere with respect to the work surface remain a problem. Reliability has been limited by a susceptibility to dirt from the surface. Mechanical mice have generally been expensive and difficult to manufacture in that they require high precision parts.

The optical mouse is comprised of a housing including a light source and light sensors, used in combination with a specially patterned work surface. As the mouse is moved across the work surface, its light sensors can detect the direction and extent of movement through pattern recognition, and provide signals for controlling corresponding movement of a cursor on a cathode ray tube. An optical mouse is described in Kirsch U.S. Pat. No. 4,364,035. The disadvantage of the optical mouse is the requirement of a special patterned pad, the necessity of the pad rather than the mouse itself setting the axes of movement and the inconvenience of having to clear the pad of other work material when the mouse is in use.

A third type of mouse, which has not gained commercial acceptance, is disclosed in Page U.S. Pat. No. 4,303,914. This mouse comprises a housing mounting two conventional piezo electric audio pick-ups, with the audio pick-ups oriented at right angles to each other. When the styli of the audio pick-ups are drawn across a microscopically textured surface, such as a sheet of paper, each audio pick-up produces a succession of uni-directional pulses with the polarity of the pulses being indicative of the direction of motion along a selected axis. The extent of motion is determined by a count of pulses, the pulse information being used to control movement of a cursor dot on a cathode ray tube. None of these mice has proven completely satisfactory, with complexity and cost being important drawbacks in the evolving widescale need for mouse devices.

SUMMARY OF INVENTION

Cursor controllers according to the invention herein produce signals for controlling the direction and distance of movement of a cursor dot or the like on the display of a computer, the cursor controllers generally comprising a displacement pad with associated displacement transducer means and velocity/distance transducer means, wherein user manipulation of the cursor controllers causing displacement of the displacement pad produces direction-indicative signals and causing vibration of the velocity/distance transducer produces distance-indicative signals. The velocity/distance transducer means is preferably of the class of vibration transducers also known as microphones, and preferably is utilized with a vibration enhancing coupling medium.

One general type of cursor controller according to the invention herein comprises a cover having the displacement pad and velocity/distance transducer means mounted thereunder wherein the user manipulation consists of grasping the cover and moving the cursor controller over a surface, thereby causing the displacement of the displacement pad and vibration of the velocity/distance transducer means. However, the invention also embraces a type of cursor controller mounted to a computer console or the like, with the velocity/distance transducer means mounted on an outwardly-facing displacement pad, and the user manipulation consists of stroking the outwardly-facing pad in the desired direction of motion. In this latter type of cursor controller, the vibration for velocity/distance transducer means is mounted with the displacement pad so that a single stroke inputs to both transducers, although the two may be separately mounted in the cursor controller used by movement over a work surface.

The displacement pad is suitably mounted for displacement in all directions, with particular suspension systems including flexible posts, bearings and elastomeric couplings, wherein the cursor controllers have good response in all directions. The displacement transducer means may comprise strain gauges mounted to strain gauge beams in a parallel link assembly having one corner fixed to the displacement pad, and may also comprise photoelectric quad cell and a light source, one of which is mounted to the displacement pad. As noted above, the velocity/distance transducer is a vibration transducer, and may comprise a piezo electric crystal, and electret or ferroelectric direct coupled microphone, a dynamic microphone, or such transducers.

The cursor controllers according to the invention herein are not sensitive to dirt or slippage, and in fact relies upon frictional slippage to produce the control signals. Moving parts are at a minimum, as are precision parts, contributing to dependability and long life. Accordingly, it is a principal object of the invention herein to provide a mouse which provides excellent response in all directions of motion.

It is a further object of the invention to provide a cursor controller which operates on a passive non-specific work surface, but is also adaptable for direct mounting on computer consoles.

It is an additional object of the invention to provide a mouse which is easily used and easily and inexpensively manufactured and serviced.

It is yet another object of the invention herein to provide a mouse which is highly reliable and in particular is not subject to failure because of dirt or dust.

These and other objects and features of the invention herein will in part be obvious and will in part appear from a perusal of the following description of the preferred embodiments and the claims, taken together with the drawings.

DRAWINGS

The same reference numerals refer to the same elements through the various Figures.

DESCRIPTION OF PREFERRED EMBODIMENTS

Figures 1, 2:
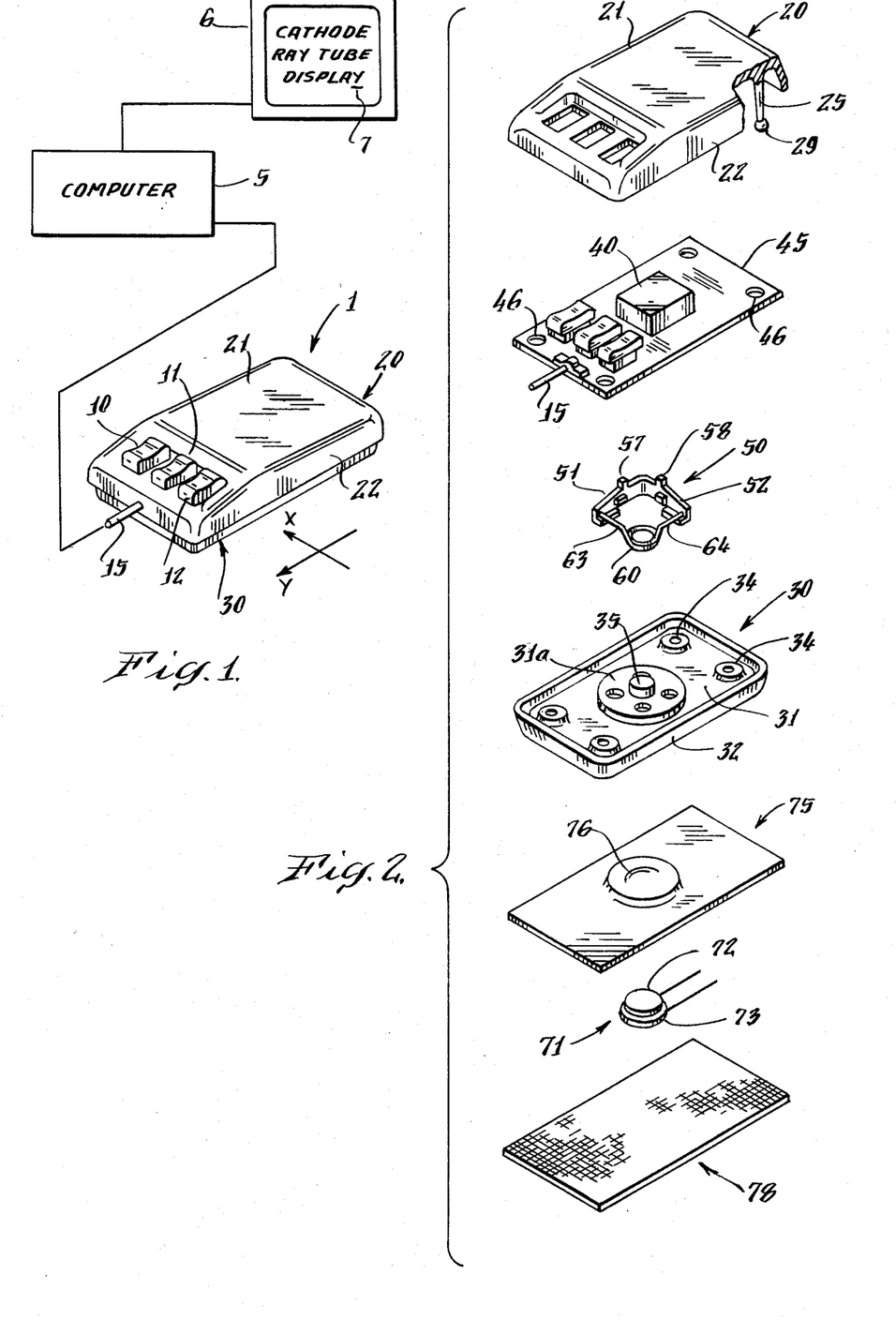
FIG. 1 is a perspective view of a cursor controller, or mouse, according to the invention herein being used as an interactive display input in a computer system.
FIG. 2 is an exploded perspective view of the mouse of FIG. 1.
Figure 7:
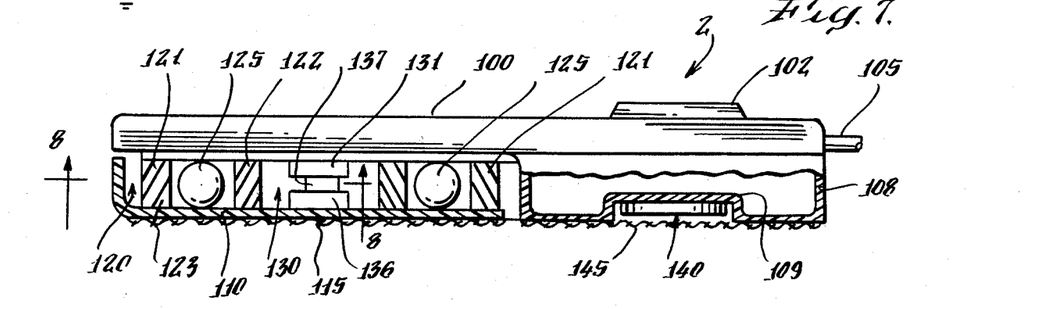
FIG. 7 is a side-elevation view, partially in section, of another cursor controller, or mouse, according to the invention herein.
Figure 8:
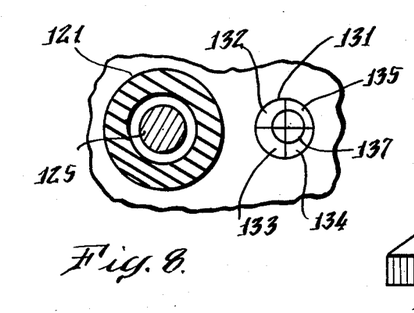
FIG. 8 is a partial sectional view of the mouse of FIG. 7, taken along the lines 8—8 of FIG. 7.

With reference to FIG. 1, a cursor controller 1 according to the invention herein is shown in operative combination with a computer 5 and a cathode ray tube display 6. The most common use of the cursor controller 1, also known as and generally referred to as a mouse, is to control movement of a cursor dot 7 on the screen of the cathode ray tube display, with movement of the cursor dot on the cathode ray tube display corresponding to movement of the mouse on a surface adjacent the computer. Button switches 10-12 on the mouse 1 are used to interact with the computer programs, e.g., by signaling for some action with respect to the particular location or a particular portion of the display designated by the cursor dot. FIGS. 7 and 8 illustrate another mouse 2, used in the same way but of different structure.

Figure 9:
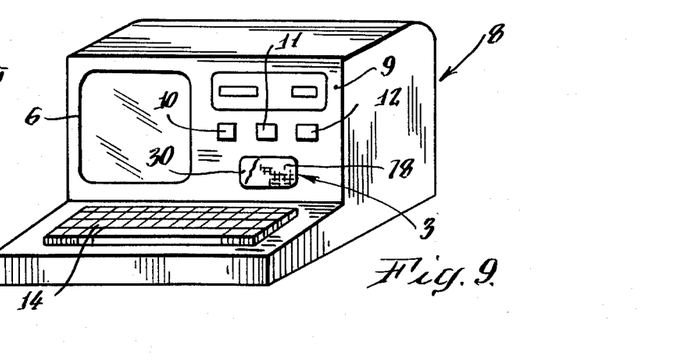
FIG. 9 is a perspective view of a cursor controller according to the invention herein mounted as a manual input in the control panel of a computer system.

FIG. 9 illustrates a mouse 3, also according to the invention herein, mounted to a computer console 8 having a cathode ray tube display 6, with button switches 10-12 also mounted to the computer console. As mice become more widely used in combination with computers, it is expected that incorporating a mouse into a computer console may prove preferable to providing a mouse as a separate accessory working on an adjacent surface, and the mice according to the invention herein are very well adapted to this expected use. The mouse 3 may be very similar to mouse 1, except inverted to have its bottom surface facing outward, as will become more apparent in discussing the detailed structure of these embodiments.

With reference to FIGS. 1-5, the mouse 1 generally comprises a cover 20, and a displacement pad 30 displaceable with respect to the cover on a resilient self-centering suspension including posts 25-28 and the spring action of a displacement transducer assembly 50. A velocity/distance transducer 70, from which the distance of mouse travel and corresponding desired cursor dot movement can be derived, is mounted to the displacement pad. An electronics package 40 is mounted to a circuit board 45 under the cover, and a mouse tail 15 of conductors is provided for communication with the computer.

The cover 20 is generally rectangular when viewed in top plan, and has a top panel 21 and depending peripheral sidewall 22, with the top panel 21 defining openings through which button switches 10-12 protrude. The displacement pad 30 is also generally rectangular, having a generally flat bottom panel 31 and upstanding peripheral sidewall 32, the upper edge of which fits inside, with clearance, the lower edge of the depending sidewall 22 of the top cover (see FIG. 3). The displacement pad is suspended from the top cover by four suspension posts 25-28. The suspension posts may be formed integrally with the top cover of a relatively stiff but resilient plastic material, and extend downwardly from the top cover to the displacement pad 30. The connection between the suspension posts and the displacement pad is preferably achieved by a ball and socket snap-fit arrangement, e.g., the suspension posts each have a ball 29 formed at their tips and the balls 29 are respectively received in sockets 34 formed in the displacement pad. This permits the pad displacement 30 and associated elements to be removed and replaced for servicing or repair of the mouse 1. The resiliency of the suspension posts 25-28 permit the displacement pad to move laterally relative to the cover, but the posts are sufficiently vertically stiff to maintain the displacement pad generally parallel with the cover. The clearance between the depending sidewall of the cover and the upwardly extending sidewall of the displacement pad provides a limit stop for the extent of relative displacement in all directions.

The displacement occurs when the mouse is moved across a surface and more particularly the displacement pad engages the surface and lags behind the cover to cause the displacement. When the cover is released and the mouse is at rest, the posts and other suspension elements center the cover with respect to the displacement pad. In the mouse of FIG. 1, the posts 25-28 form a portion of a self-centering resilient suspension system for the displacement pad 30, with the displacement transducer assembly 50 more fully described below also having suspension aspects; however, it will be appreciated that the posts alone could provide the self-centering suspension function, particularly if a different form of displacement transducer were employed.

Figure 4:
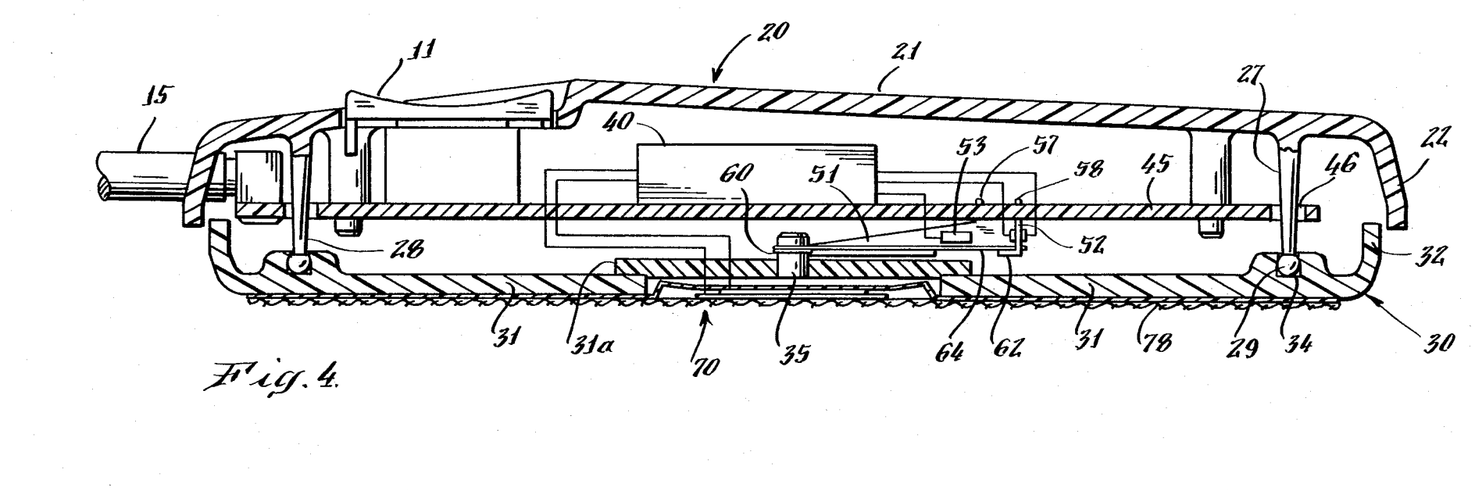
FIG. 4 is a sectional view of the mouse of FIG. 1, taken along the lines 4—4 of FIG. 3.

The cover 20 also mounts a printed circuit board 45, via screws which extend through the circuit board to mounting pads formed integrally with the cover, as best seen in FIG. 4. The printed circuit board 45 defines openings respectively, accommodating, with clearance, the suspension posts, e.g. opening 46 for suspension post 27. This permits the suspension posts to bend without contacting the printed circuit board; however, if desired, the openings can be sized to provide limit stops for lateral movement of the displacement pad rather than relying upon engagement between the sidewalls of the displacement pad and cover for that purpose.

The printed circuit board 45 mounts the bottom switches 10-12, which extend upwardly through the cover for operation. The printed circuit board also mounts electronics, schematically indicated as an electronics box 40, in FIG. 2, although it will be appreciated that the electronics 40 is comprised of various components mounted to the circuit board in standard fashion. The electronics package processes the signals derived from the displacement transducer and velocity/distance transducer assemblies. A circuit is discussed hereafter.

The displacement transducer assembly 50 is mounted between the printed circuit board 50 and the displacement pad 40. The displacement transducer assembly converts displacement of the pad relative to the printed circuit board and cover into electrical signals, from which the direction of movement is derived. As perhaps best seen in FIGS. 1-3, the generally rectangular shape of the cover defines a coordinate system of the mouse, the y-axis comprising the longitudinal axis of the cover with the positive direction being at the end mounting the buttons 10-12. The x-axis is perpendicular thereto. Thus, the user would grasp the mouse with the buttons away from him, in the same manner the user would generally draw in an x - y coordinate system, so that movement of the mouse will correspond to desired movement of the cursor dot in the usual manner.

Figure 5:
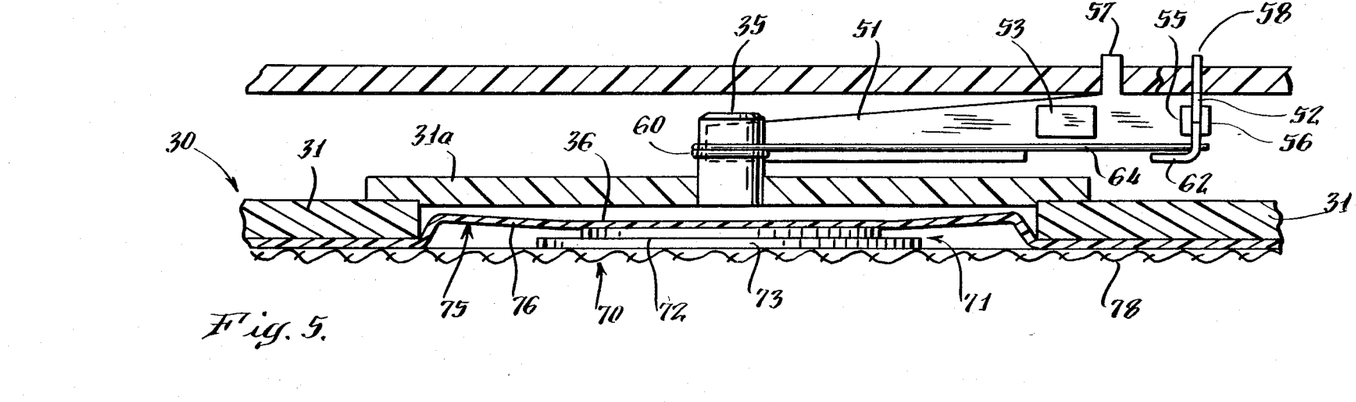
FIG. 5 is an enlarged side-elevation view of the velocity/distance and direction transducer means of the mouse of FIG. 1, FIG. 5 corresponding to the central portion of FIG. 4.

The displacement transducer assembly 50 comprises an x-axis gauge beam 51 and ay-axis gauge beam 52. Each gauge beam has a pair of strain gauges attached thereto, strain gauges 53 and 54 being mounted to the x-axis gauge beam 51 and strain gauges 55 and 56 being mounted to the y-axis gauge beam 52. The x-axis and the y-axis gauge beams are formed in an integral "L", and each gauge beam has an upstanding mounting post 57, 58, respectively, near the corner of the "L". The mounting posts are inserted through openings in the printed circuit board 45 and secured therein, e.g. by solder, to mount the gauge beams to the underside of the printed circuit board, as best seen in FIGS. 4 and 5. The strain gauges are mounted to the gauge beams near the mounting posts, and the remaining extending portions of the gauge beams are provided with strengthening flanges 61 and 62, wherein bending of the gauge beams is concentrated in the area where the strain gauges are mounted.

Figure 3:
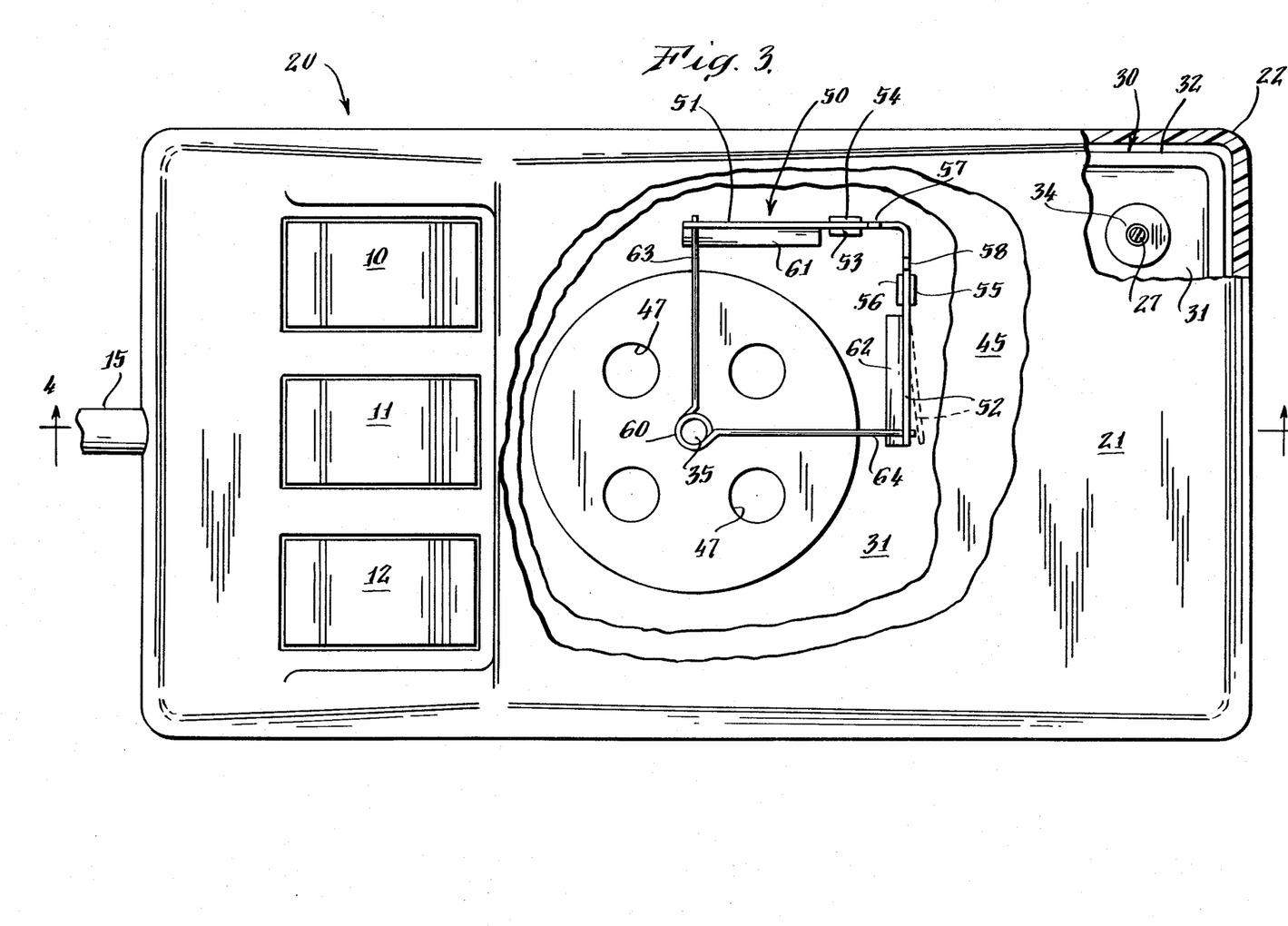
FIG. 3 is a top plan view, partially cut away, of the mouse of FIG. 1.

The displacement transducer assembly 50 further comprises beam connecting arms 63 and 64 which may be an integral wire form having a loop 60 formed at the intersection of the arms. The ends of the arms 63 and 64 are respectively connected to the ends of the gauge beams 51 and 52, as best seen in FIG. 3. The loop 60 receives a pin 35 upstanding from the displacement pad 30, the pin being removably received in the loop to facilitate removing the displacement pad for service or repair purposes. The beam connecting arms 63 and 64 couple the motion of the displacement pad to the ends of the strain gauge beams, and are effective in decoupling x-axis motion from the y-axis strain gauge beam and y-axis motion from the x-axis strain gauge beam.

When the mouse 1 is on a surface and the cover 21 is moved in the positive y-axis direction, the displacement pad lags behind the cover, wherein the beam connecting arm 74 bends the y-axis strain gauge beam 52 as shown in exaggerated dotted lines in FIG. 3. This compresses one of the strain gauges 55 and 56 and elongates the other, from which the direction of the motion may be derived by circuit means 40 incorporating the strain gauges. It will be noted that for the y-axis motion, the beam connecting arm 63 merely flexes and acts minimally on the x-axis strain gauge beam 51. Motion in the x-axis is detected similarly, with beam connecting arm 63 flexing strain gauge beam 51 to stress strain gauges 53, 54. For motion having components in both the x and y axes, the strain gauge beams are deflected in proportion to the motion in each axis, thereby permitting the direction of motion to be ascertained. The strain gauge beams also form a part of the suspension system of the displacement pad, in that they act with the posts to recenter the cover on the pad once motion and pressure are released.

Distance is derived from the output of a velocity/distance transducer assembly 70. The output of this transducer is a function of the velocity of movement of the mouse 1 across a surface, from which the distance can be calculated. In the mouse 1, the particular transducer employed is a piezo electric transducer 71 comprising a crystal 72 on a thin conductive plate 73. The piezo electric transducer 71 is mounted to a flexible formed diaphragm 75, and more particularly, to a recessed central portion 76 thereof. The flexible formed diaphragm 75 is preferably formed in a rectangular shape which is substantially co-extensive with the underside of the displacement pad 30. The bottom panel 31 of the displacement pad 30 defines a central recess 36, covered by an offset portion 31a of the bottom panel. The recess 36 accommodates the offset central portion 76 of the formed diaphragm 75, the central portion 76 mounting the piezo electric transducer 71 on the underside thereof and biasing the piezo electric transducer 71 downwardly for good pressure against the surface on which the mouse 1 is used. The biasing function of the central portion 76 of the diaphragm 75 also achieves a uniform pressure engagement between the piezo electric transducer and the work surface, i.e., a uniform pressure despite variation in the amount of downward pressure exerted on the cover 20 by a user.

The offset bottom panel portion 31a is provided with at least one opening 37 through which leads from the piezo electric transducer may be routed to the printed circuit board 45 for connecting the piezo electric transducer into the circuits of the electronics package 40.

A surface coupling bottom cover 78 is deployed over the bottom surface of the mouse 1, and more particularly over the underside of the formed diaphragm 75 and the piezo electric transducer 71. The surface coupling bottom cover 78 is chosen to create and enhance vibration imparted to the piezo electric transducer 71 as the mouse is moved over a work surface, and also to provide requisite friction for displacement of the displacement pad 30 relative to the cover 20, in a controlled and relatively smooth manner rather than in skips and jumps. Although the particular material for the surface coupling bottom cover will in part depend upon the surface on which the mouse is to be used, materials which are acceptable for the surface contact bottom cover are Velcro, velvet and velours, felt, bristle, leather, and the like, with materials having relatively stiff extending fibers being particularly advantageous.

It will be noted that the surface coupling bottom cover contacts the piezo electric transducer 71 directly, whereby it imparts the vibration or "noise" to the transducer. There is a sufficient contact area to average out the "noise", i.e. a bump or minor surface irregularity will not produce aberrant data. It is believed that small portions of the surface coupling bottom cover act as isolated vibration producers and transmitters, with the transducer experiencing the sum.

Thus, as the mouse 1 is moved on a surface, the bottom displacement pad 30 is displaced relative to the cover 20, and the direction of displacement is ascertained through the displacement transducer assembly 50. The movement of the mouse on the surface also causes vibration which is sensed by the velocity/distance transducer assembly 70, the vibration being a function of velocity from which the distance of motion can be calculated. Thus, the mouse is capable of translating its motion into corresponding motion of a cursor dot on the cathode ray tube display.

Figure 6:
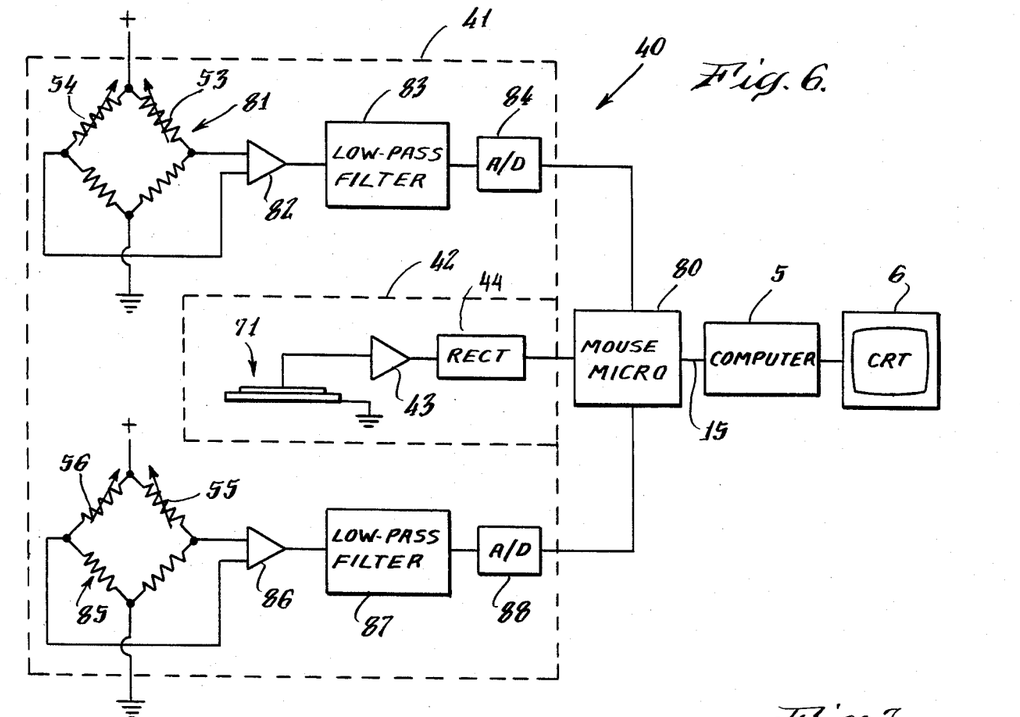
FIG. 6 is a schematic diagram of circuit means of the mouse of FIG. 1.

With reference to FIG. 6, there is shown a schematic circuit diagram of suitable mouse electronics 40 for generating cursor dot control signals from the displacement transducer and velocity/distance transducer, based on mouse motion on a work surface. The electronics 40 is divided generally into strain gauge circuitry 41, surrounded by a U-shaped dotted outline in FIG. 6, and the velocity/distance transducer circuitry 42, also surrounded by a dotted outline in FIG. 6. The strain gauge circuitry 41 and velocity/distance transducer circuitry 42 include the respective transducers in circuits having outputs which form suitable inputs to a mouse microprocessor 80, which communicates with the main computer 5 through the mouse tail 15. The main computer 5, of course, controls the cathode ray tube display 6, with the mouse inputs utilized in accordance with the active software.

More particularly, the x-axis strain gauges 53 and 54 are connected in an x-axis resistance bridge 81, the bridge output being connected to an amplifier 82. The amplified bridge signal may be filtered by a low-pass filter 83, if desired, to remove any vibrational AC component and provide only the DC directional component, which is converted to a digital value via an analog-to-digital converter 84. The digital value is provided to the mouse microprocessor 80, and represents the x-axis component of mouse motion.

The y-axis strain gauges 55 and 56 are connected into a y-axis resistance bridge 85, the output of which is amplified by amplifier 86, filtered by low-pass filter 87 and converted to a digital value by analog-to-digital converter 88, thereby providing a y-axis component of mouse motion to the mouse microprocessor 80. The microprocessor 80 is suitably programmed to derive the direction of mouse motion from the x-axis and y-axis components, based upon trigonometric principles.

The electronics for distance determination are exceedingly simple, inasmuch as the signal produced by the piezo electric transducer 71 is function of the velocity at which the mouse is moved across a surface. Accordingly, the signal is amplified by amplifier 43 and rectified by rectifier 44 to provide a DC signal which is a function of speed to the mouse microprocessor 80. Although the output of the piezo electric transducer 71, and hence also the rectifier 44, are a function of the velocity of mouse motion, the function is not linear. Accordingly, the microprocessor 80 may be programmed to derive a linear signal from the signal presented to it. In the example of the piezo electric transducer 71, the output varies approximately as the square root of a linear function, and the mouse microprocessor can square the signal; with additional shaping as required, to derive a linear value. The distance of travel may then be calculated by the well-known formula: distance=velocity×time, wherein the time may be a sampling of a period or multiple of a clock period of the mouse microprocessor.

It will be appreciated that the circuitry is in the form of electrical components and chips, and that they are mounted in appropriate manner on the circuit board printed with a suitable circuit, wherein distance signals, direction signals and button-status signals are provided to the computer 5 over the mouse tail 15.

With reference to FIG. 7 and 8, another mouse 2 according to the invention herein is shown. The mouse 2 generally comprises a top cover 100, a displacement pad 110 depended from the top cover by means of a suspension system 120, and a displacement transducer assembly 130. The mouse 2 further comprises a velocity/distance transducer 140 mounted to a bottom cover 108, the bottom cover being generally coplanar with the displacement pad 110 on a work surface, and a surface coupling bottom cover 115,145 deployed over the underside of the displacement pad and bottom cover.

The top cover 100 provides a means for grasping and manipulating the mouse 2 on a work surface, and also encloses the necessary circuitry and the like for operating the mouse. In this regard, buttons 102 may protrude from the top cover 100, and a mouse tail cord 105 connects the mouse into a computer system, not shown. The top cover 100 also provides the mounting support for the displacement pad 110, with the suspension system 120 connecting the top cover and the displacement pad for relative lateral movement. The suspension system 120 comprises a plurality of elastomeric bushings 121, preferably of cylindrical shape, having an upper surface secured to the underside of the top cover at 122 and a bottom surface secured to the displacement pad at 123. The joinders can be accomplished in any suitable manner, including by glues or by providing a flange or the like on the end of the bushing for capture by cooperating structure. The cylindrical elastomeric bushings 121 each surround a spherical bearing 125, which serves to maintain separation between the top cover and displacement pad during relative lateral displacement. The elastomeric bushings are sufficiently flexible to permit lateral displacement of the displacement pad relative to the top cover as the mouse 2 is moved over a surface, and of course the amount of the force to achieve a certain amount of displacement is uniform for any direction of movement.

The displacement pad is provided with a bottom coupling bottom cover 115, which may be felt, suede, or the like for generating suitable friction between the displacement pad and the surface in order to cause lateral displacement of the displacement pad during mouse movement.

Displacement is sensed by the displacement transducer assembly 130, which comprise a photoelectric quad cell 131 and an associated light source 136 producing a light beam 137. With reference to FIG. 8, the photoelectric quad cell 131 is divided into four quadrants 132–135, each of which independently produces a signal which is a function of the amount of light input. It is convenient for the beam of light 137 to be centered on the photoelectric quad cell 131 prior to movement of the mouse 2 and consequent displacement of the displacement pad relative to the top cover. It will be appreciated that such displacement also displaces the beam of light 137 to an off-center position, as illustrated by a beam outline 137 in FIG. 8. Thus, the outputs from the quadrants are altered and may be compared to determine the direction of displacement and hence the direction of movement of the mouse.

The top cover has mounted thereto, adjacent the displacement pad a bottom cover 108, having a bottom surface generally coplanar with the displacement pad 110 so that the mouse will rest upon and slide smoothly upon a flat work surface. The bottom cover 108 has a recessed portion 109, in which a velocity/distance transducer 140 is mounted. The velocity/distance transducer 140 comprises a microphone, e.g. an electret or any other sensitive microphone, deployed to listen to noise created as the mouse is moved across a work surface. In this regard, an additional surface coupling bottom cover 145 is secured to the underside of the bottom cover 108 and extends across the opening of the recess in which the microphone 140 is mounted. Felt or other fabric or bristle material which creates noise is suitable for the surface coupling bottom cover. The surface coupling bottom cover need not be secured directly to the microphone in order for the microphone to respond to the noise, this being optional design criteria, although microphone output is generally better with the bottom cover attached directly to the microphone. In either case, the microphone output is a function of velocity, from which distance can be derived.

Both the quad cell 131 and microphone 140 are connected in suitable circuitry for producing control signals to move a cursor dot or the like corresponding to distance and direction of mouse motion on a surface.

With reference to FIG. 9, another mouse 3 according to the invention herein is illustrated mounted in the front panel 9 of a computer console 8, the computer console including a cathode ray tube display 6. The mouse 3 corresponds closely to the mouse 1, and more particularly the exposed portion of the mouse is the displacement pad 30 having the velocity/distance transducer 70 (not shown) mounted therein. The main structural difference between the mouse 3 and the mouse 1 is that instead of a top cover providing the support for the displacement pad, the displacement pad is instead supported by the computer console itself, and the buttons 10–12 may be provided on the panel of the computer console as well.

The difference in operation between the mouse 3 and the mouse 1 is that the mouse 3 is operated by stroking the exposed displacement pad in the direction of desired movement. More particularly, the stroking may be accomplished by either a finger or a suitable implement such as pen or the eraser end of a pencil, which engages with the displacement pad and displaces it to determine a direction of motion. As the finger or other implement is moved across the displacement pad, and a noise generating surface coupling bottom cover 78 thereof, noise is generated and transmitted to the velocity/distance transducer, which produces a distance control signal based on the amount of noise. If it is desired to move the cursor dot only a short distance, a light short stroke is applied to the displacement pad, generating a low level of noise for a short time period. If it is desired to move the cursor dot a longer distance, a firmer and longer stroke may be applied, thereby generating more noise for a longer time period. Once the cursor dot is at the desired location, the cursor control buttons 10–12 may be operated as desired, or they can be eliminated altogether and their function replaced by utilizing designated keys on the standard keyboard 150.

Accordingly, there have been described several cursor controllers which admirably achieve the objects of the invention herein. It will be appreciated, however, that the description is of preferred and illustrative embodiments and is not to be construed as limiting. For instance, many types of noise transducers may be employed, e.g. electret microphones, ferroelectric microphones, more conventional crystal and dynamic microphones, etc., and it may be desirable to utilize plural microphones for more uniform response. Similarly, variations of the suspension system are feasible and, of course, the support for the displacement pad may be either a movable cover or a fixed housing. One variation in the assembly consists of using springs as the elastomeric member together with ball bearing or other spacers between the cover or fixed support and the displacement pad. Alternate displacement transducer means may also be substituted, and a wide variety of friction and noise generating surface coupling materials may be used. In fact, one of the main advantages of cursor controllers according to the invention herein is the absence of high precision, complicated components.

These and other variations will occur to those skilled in the art and may be made without departing from the spirit and scope of the invention, which is limited only by the following claims.

We claim:

1. A cursor controller for controlling movement of a cursor dot or the like on the display of a computer system, the cursor controller comprising:
   (A) a displacement pad and support means therefor;
   (B) suspension means mounting the displacement pad to the support means and permitting relative lateral two-dimensional motion therebetween;
   (C) displacement transducer means responsive to relative motion between the displacement pad and the support means therefor, the displacement transducer means providing a signal indicative of the direction of relative movement;
   (D) a velocity/distance transducer means mounted to be responsive to vibration caused by relative movement between the displacement pad and a surface engaged with the displacement pad, said velocity/distance transducer means producing a signal which is a function of the velocity and distance of relative movement; and
   (D) calculating means for deriving signals indicative of the direction and distance of movement desired of the cursor dot, based on the direction of displacement of the displacement pad and the vibration sensed by the velocity/distance transducer.

2. A cursor controller as defined in claim 1 wherein the velocity/distance transducer is mounted to the displacement pad.

3. A cursor controller as defined in claim 2 wherein the displacement pad and velocity/distance transducer are covered with a surface coupling cover enhancing frictional and vibrational interaction with the displacement pad and velocity/distance transducer.

4. A cursor controller as defined in claim 3 wherein the velocity/distance transducer is a microphone.

5. A cursor controller as defined in claim 4 wherein the microphone is directly coupled with the surface coupling cover.

6. A cursor controller as defined in claim 2 wherein the support means for the displacement pad is a fixed housing, and wherein relative movement of the displacement pad with respect to the housing is achieved by stroking the displacement pad, the stroking also setting up vibrations to which the velocity/distance transducer is responsive.

7. A cursor controller as defined in claim 6 and further comprising a surface coupling cover on the exposed surface of the displacement pad, the surface coupling cover enhancing frictional and vibrational interaction with the displacement pad and velocity/distance transducer.

8. A cursor controller as defined in claim 7 wherein the velocity/distance transducer is a microphone.

9. A cursor controller as defined in claim 1 wherein the support means for the displacement pad is a cover adapted to be gripped by a user, whereby relative motion between the cover and displacement pad is achieved by placing the displacement pad on a surface and sliding it across the surface while grasping the cover, the sliding motion also causing vibrations received by the velocity/distance transducer.

10. A cursor controller as defined in claim 9 wherein the velocity/distance transducer is a microphone responsive to the noise created when the displacement pad is slid across a surface.

11. A cursor controller as defined in claim 10 wherein the microphone is mounted to the displacement pad.

12. A cursor controller as defined in claim 11 wherein the microphone is piezo electric transducer.

13. A cursor controller as defined in claim 11 wherein the microphone is mounted to the displacement pad by means of a spring-bias support which spring-biases the microphone with uniform pressure toward the surface over which the cursor controller is moved.

14. A cursor controller is defined in claim 11 and further comprising a surface coupling cover on the surface of the displacement pad, the surface coupling cover enhancing frictional and vibrational interaction with the displacement pad and velocity/distance transducer.

15. A cursor controller as defined in claim 14 wherein the surface coupling cover is felt.

16. A cursor controller as defined in claim 15 wherein the microphone is a piezo electric transducer and the felt is directly coupled to the input surface of the piezo electric transducer.

17. A cursor controller as defined in claim 9 wherein the suspension means mounting the displacement pad to the cover comprises a plurality of vertically stiff, laterally resilient posts extending between the displacement pad and cover, said posts bending to permit displacement of the displacement pad relative to the cover.

18. A cursor controller as defined in claim 17 wherein the displacement pad is in snap-fit engagement on the ends of the suspension posts, whereby the displacement pad is removable to provide access for repair or service.

19. A cursor controller as defined in claim 9 wherein the suspension means mounting the displacement pad to the cover comprises at least one elastomeric member secured to both of and extending between the displacement pad and the cover, the elastomeric member being deformable to permit the relative movement.

20. A cursor controller as defined in claim 19 and further comprising bearing means positioned between the displacement pad and the cover for maintaining the separation therebetween while permitting relative lateral displacement.

21. A cursor controller as defined in claim 1 wherein the displacement transducer means comprises first and second gauge beams fabricated in an "L" with its intersection secured to one of the displacement pad or the support means, at least one strain gauge secured to each of the gauge arm beams, and an L-shaped wire arm linkage having its intersection secured to the other of the displacement pad or support means and having its arm ends respectively secured to the ends of the gauge arm beams, whereby relative displacement of the displacement pad with respect to the support means causes bending of the gauge arm beams, thereby stressing the strain gauges to provide a signal indicative of the direction of displacement.

22. A cursor controller as defined in claim 9 wherein the displacement transducer means comprises first and second gauge beams fabricated in an "L" with its intersection secured to the cover, at least one strain gauge secured to each of the gauge arm beams, and an L-shaped wire arm linkage having its intersection secured to the displacement pad and having its arm ends respectively secured to the ends of the gauge arm beams, whereby relative displacement of the displacement pad with respect to the cover causes bending of the gauge arm beams, thereby stressing the strain gauges to provide a signal indicative of the direction of displacement.

23. A cursor controller as defined in claim 16 wherein the displacement transducer means comprises first and second gauge beams fabricated in an "L" with its intersection secured to the cover, at least one strain gauge secured to each of the gauge arm beams, and an L-shaped wire arm linkage having its intersection secured to the displacement pad and having its arm ends respectively secured to the ends of the gauge arm beams, whereby relative displacement of the displacement pad with respect to the cover causes bending of the gauge arm beams, thereby stressing the strain gauges to provide a signal indicative of the direction of displacement.

24. A cursor controller as defined in claim 17 wherein the displacement transducer means comprises first and second gauge beams fabricated in an "L" with its intersection secured to cover at least one strain gauge secured to each of the gauge arm beams, and an L-shaped wire arm linkage having its intersection secured to the displacement pad and having its arm ends respectively secured to the ends of the gauge arm beams, whereby relative displacement of the displacement pad with respect to the support means causes bending of the gauge arm beams, thereby stressing the strain gauges to provide a signal indicative of the direction of displacement, and said gauge arm beams also comprise a portion of the suspension means in providing desired loading against displacement and centering thereafter.

25. A cursor controller as defined in claim 1 wherein the displacement transducer means comprises a photoelectric quad cell secured to one of the support means or displacement pad and a light source secured to the other of the support means or displacement pad, said light source deployed to provide a beam of light received by the photoelectric quad cell, wherein displacement of the displacement pad relative to the support means causes the light beam from the light source to be moved on the photoelectric quad cell, whereby the direction of movement can be ascertained from the altered output of the individual cells of the photoelectric quad cell.

26. A cursor controller for controlling movement of a cursor dot or the like on a computer display in accordance with movement of the cursor controller, the cursor controller comprising:
- (A) a housing adapted for sliding motion on a work surface, said sliding motion producing noise;
- (B) means for determining the direction of motion of housing;
- (C) a microphone mounted in the housing and responsive to the noise generated by sliding motion, said noise output of the microphone being a function of the velocity and therefore also of the distance of motion; whereby control signals corresponding to the distance of motion can be drived from the microphone signal.

27. A cursor controller as defined in claim 26 wherein the microphone is coupled to the surface over which the cursor controller slides via a fibrous noise enhancing coupling medium.

28. A cursor controller as defined in claim 27 wherein the vibration in enhancing coupling medium is felt.

29. A cursor controller as defined in claim 28 wherein the microphone is the piezo electric crystal transducer.

30. A cursor controller as defined in claim 29 wherein the piezo electric transducer is resiliently mounted to the cursor controller housing and is spring-biased into uniform pressure contact with the surface over which the cursor controller housing slides.

31. A method of deriving control signals for a cursor dot on a computer controlled cathode ray tube display, comprising:
- (A) providing a mouse for sliding movement on a work surface including a cover and a displacement pad suspended from said cover and contacting the surface;
- (B) moving the mouse in the desired direction of cursor dot movement, thereby displacing the displacement pad relative to the cover and creating noise during mouse movement by means of frictional and vibrational interaction between the displacement pad and surface;
- (C) during movement of the housing on the surface ascertaining the direction of displacement of the displacement pad and monitoring the amount of noise created by means of a microphone; and
- (D) calculating the direction and distance of mouse motion on the work surface respectively from the displacement of the displacement pad and the noise and providing the calculated direction and distance of motion for use in controlling the motion of a cursor dot on a computer-controlled cathode ray display.

* * * * *